United States Patent [19]

Earley

[11] Patent Number: 4,531,246
[45] Date of Patent: Jul. 30, 1985

[54] REMOVABLE GARBAGE BAG HOLDER FOR KITCHEN SINKS

[76] Inventor: John J. Earley, P.O. Box 196, Lansdowne, Pa. 19050

[21] Appl. No.: 564,558

[22] Filed: Dec. 22, 1983

[51] Int. Cl.³ .............................................. E03C 1/18
[52] U.S. Cl. .......................................... 4/629; 4/654;
248/95; 248/201; 248/220.1; 248/315
[58] Field of Search ................. 4/628, 629, 638, 654, 4/619; 248/95, 99, 201, 206.3, 220.1, 315, DIG. 7; 220/404

[56] References Cited

U.S. PATENT DOCUMENTS

| | | | |
|---|---|---|---|
| 208,094 | 9/1878 | Higgins | 4/628 |
| 1,052,379 | 2/1913 | Ranken | 220/404 |
| 1,121,388 | 12/1914 | Milks | 248/95 |
| 1,548,986 | 8/1925 | Donovan . | |
| 1,635,361 | 7/1927 | Fuson | 4/629 |
| 1,668,053 | 5/1928 | Dawson . | |
| 1,696,464 | 12/1928 | Walker | 4/629 |
| 1,996,303 | 4/1935 | McConnell . | |
| 2,044,520 | 6/1936 | Weiant, Jr. | 248/206.3 |
| 2,172,188 | 9/1939 | Cather | 4/629 |
| 2,457,918 | 1/1949 | Pierce . | |
| 2,498,502 | 2/1950 | O'Brien | 4/629 |
| 3,025,389 | 3/1962 | Esch . | |
| 3,233,854 | 2/1966 | Morgan . | |
| 3,260,488 | 7/1966 | Kliewer et al. . | |
| 3,329,382 | 7/1967 | Ryan . | |
| 3,352,520 | 11/1967 | Bumgarner et al. . | |
| 3,541,322 | 11/1970 | Bennett . | |
| 3,788,720 | 1/1974 | Schneider . | |
| 4,069,994 | 1/1978 | Wharmby . | |
| 4,268,392 | 5/1981 | Hayes | 4/638 |

Primary Examiner—Stephen Marcus
Assistant Examiner—Linda J. Sholl
Attorney, Agent, or Firm—John F. A. Earley; John F. A. Earley, III

[57] ABSTRACT

A removable garbage bag holder for holding garbage bags open in kitchen sinks, such as the plastic food bags used in bringing food home from grocery stores, for receiving peelings of fruit and vegetables being peeled above it, and for receiving leftover food from dinner plates and the like, comprising a cylindrical ring, a first mounting bracket with a first suction cup, a second mounting bracket with a second suction cup, with the first suction cup facing 90° away from the second cup so as to attach to adjacent walls in a corner of a sink.

3 Claims, 2 Drawing Figures

REMOVABLE GARBAGE BAG HOLDER FOR KITCHEN SINKS

FIELD OF THE INVENTION

This invention relates to the field of garbage disposal, and more particularly concerns a removable garbage bag holder that may be easily mounted in the corner of a kitchen sink and used by a housewife, and be easily removed when desired.

BACKGROUND OF THE INVENTION

Every day more than 100 million plastic food bags are used by customers to bring their food home from grocery stores. Quite often these plastic food bags are then used as waste containers for garbage. Such use provides a great improvement over paper bags which tend to leak and disintegrate. However, because these bags are made of a light synthetic material, they do not remain open by themselves.

Although bag holders exist that hold a plastic bag open, none has solved the problem of allowing a person to work with both hands free over an open plastic bag at a kitchen sink. These other bag holders have not been suitable for use inside a sink where, for instance, peeling and washing of vegetables take place. In the past, vegetables and the like had to be either peeled over a trash can and then moved to the sink for washing, or peeled and washed in the sink with the peelings being collected later for disposal to the garbage can. Both ways were messy and inconvenient.

SUMMARY OF THE INVENTION

Accordingly, it is an object of this invention to overcome the aforementioned problem and permit a housewife to work above a kitchen sink over a disposable plastic bag with both hands being free.

It is also an object of this invention to provide a garbage bag holder which is uncomplicated to use and economical to manufacture.

It is also an object of this invention to provide a garbage bag holder which fits almost every size plastic bag.

It is also an object of this invention to provide a garbage bag holder that may be easily repositioned in a sink at any height above the sink basin so that even short plastic bags may be used with the bottom of the bag supported by the bottom of the sink.

It is also an object of this invention to provide a garbage bag holder that may be removed easily from the sink if need be, for instance if room is needed to wash a big pan, and thereafter easily reattached to the sink.

It is another object to eliminate garbage drippings.

It is another object to provide a garbage bag holder that eliminates the need for emptying the garbage into the garbage can after every meal.

DETAILED DESCRIPTION OF THE INVENTION

Figure 2:
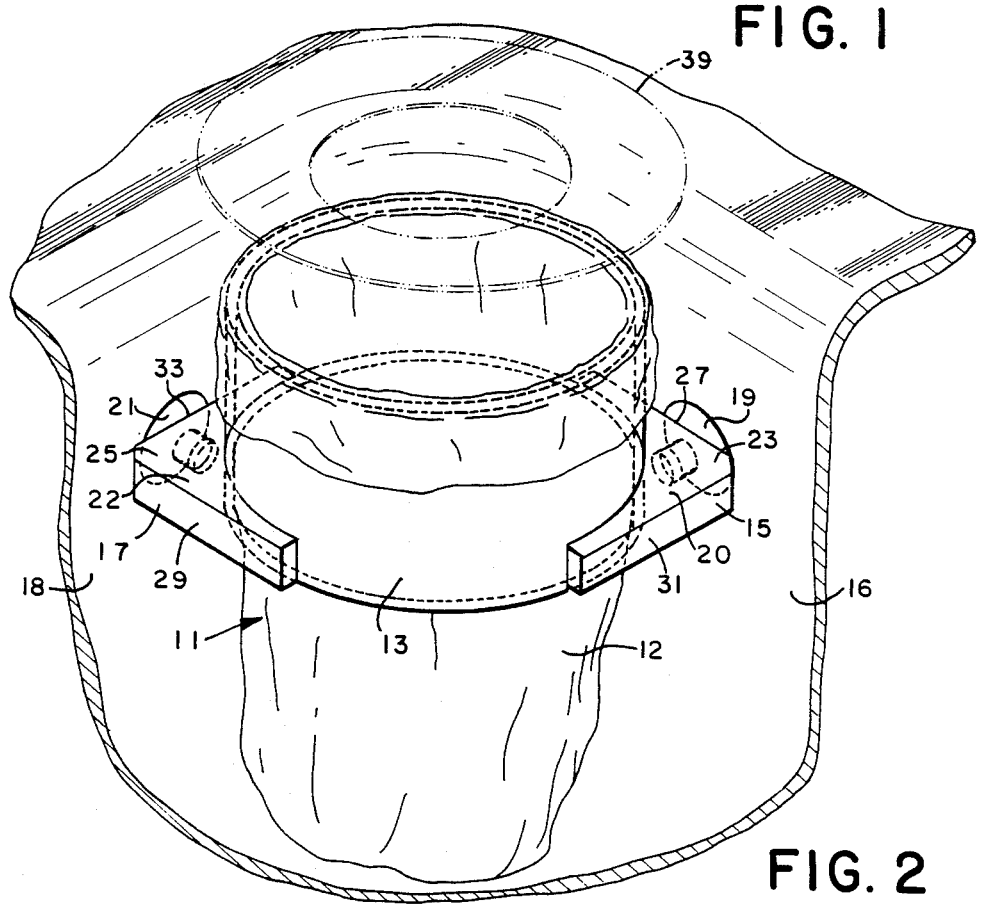
FIG. 2 is a view in perspective of the garbage bag holder of the invention attached to a corner of a kitchen sink.

Turning now to the drawings, FIG. 2 shows a garbage bag holder 11 for holding bags open in kitchen sinks without using the hands so as to leave the hands free for kitchen chores. The garbage bag holder is particularly adapted for holding plastic food bags 12 that are used in bringing food home from grocery stores. Bags 12 while held in holder 11 are adapted for receiving peelings of fruit or vegetables being peeled above it, and for receiving leftover food from dinner plates.

Garbage bag holder 11 comprises a cylindrical ring 13, a first mounting means 15 mounted on the outside of ring 13 for removably attaching bag holder 11 to a wall 16 of a sink, and a second mounting means 17 mounted on the outside of ring 13 for removably attaching bag holder 11 to a wall 18. First mounting means 15 includes a first suction cup 19 mounted on a first bracket 20 and extending outwardly from ring 13, and second mounting means 17 includes a second suction cup 21 mounted on a second bracket 22 and also extending outwardly from ring 13. First suction cup 19 faces 90° away from second suction cup 21 so as to attach to adjacent walls 16 and 18 in a corner of a kitchen sink.

The cylindrical ring 13 may be 6 inches in diameter and 2¾ inches high with a wall thickness of about ⅛th inch.

Mounted in the cylindrical ring 13 are first and second mounting brackets 20, 22 which are 180° apart from each other on the outside of the cylindrical ring 13 at the bottom of the ring. Mounting bracket 20 has a right angle 23 and bracket 22 has a right angle 25 with surfaces tangent to the ring circumference. First tangent surface 27 of first mounting bracket 20 is parallel to first tangent surface 29 of second bracket 22, and second tangent surface 31 of first bracket 20 is parallel to second tangent surface 33 of second bracket 22.

First suction cup 19 is mounted on first tangent surface 27 of first bracket 20, and second suction cup 21 is mounted on second tangent surface 33 of mounting bracket 22.

Figure 1:
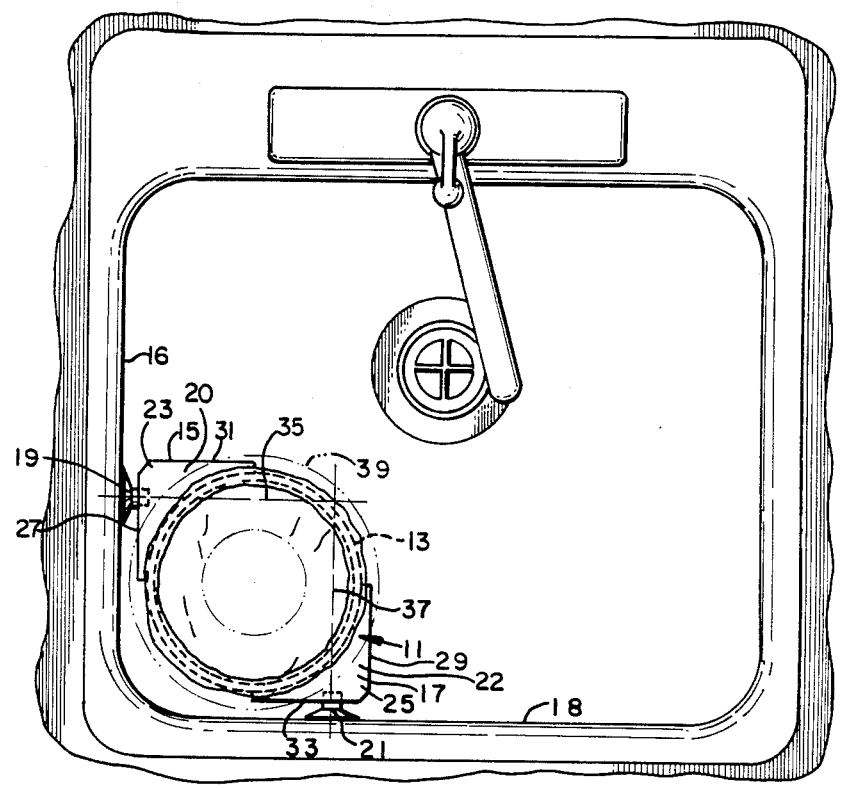
FIG. 1 is a view in top plan showing a garbage bag holder constructed in accordance with the invention mounted in a kitchen sink.

Referring to FIG. 1, suction cups 19, 21 have axes 35, 37 at 90° from each other so that the suction cups 19, 21 face outwardly and are adapted to removably mount cylindrical ring 13 in a corner of a kitchen sink with the top position of the ring positioned above the top of the sink basin and the bottom of bag 12 resting on the bottom wall of the sink, as desired.

Removable garbage bag holder 11 is mounted in a corner of a kitchen sink by pressing the suction cups 19, 21 against the sink walls.

A plastic bag 12, such as one used in bringing food home from grocery stores, with an opening having a diameter greater than that of the cylindrical ring 13, is placed on the removable bag ring 11 by looping the upper edge of the bag outwardly over the cylindrical ring 13. The bottom of the bag may rest on the bottom wall of the sink.

If garbage is placed in the bag, and the bag is not full, it may remain in the sink. However, this may cause undesirable odors. To avoid this, a saucer 39 may be placed on top of the ring 13. Of course, the bag may be removed from holder 11 and its top may be twisted closed to keep any smell of garbage sealed in the bag. When the bag is full, it may be twisted closed and transferred to a garbage can.

I claim:

1. A removable garbage bag holder for holding garbage bags open in kitchen sinks without using hands so as to leave the hands free for kitchen chores, comprising a cylindrical ring adapted to have the top of a garbage bag folded onto it with the main portion of the bag depending therefrom, a first mounting means for removably attaching the garbage bag holder to a wall of a kitchen sink mounted on the outside of the ring with a first suction cup facing outwardly from the ring, and a second mounting means for removably attaching the garbage holder to a wall of a sink mounted on the outside of the ring with a second suction cup facing outwardly from the ring, the first suction cup facing 90° away from the second suction cup so as to attach to adjacent walls in a corner of a sink, whereby the removable bag holder is adapted to be mounted in a corner of a kitchen sink with the top portion of the ring positioned above the bottom wall of the sink, is adapted to hold a garbage bag at its top with the bottom of the bag resting on the bottom wall of the sink and is adapted to accommodate bags of various lengths because the removable bag holder may be adjusted to any height in the sink.

2. The removable garbage bag holder of claim 1, said cylindrical ring being 6 inches in diameter and 2¾ inches high with a wall thickness of about ⅛th inch.

3. A removable garbage bag holder for holding garbage bags open in kitchen sinks without using hands so as to leave the hands free for kitchen chores, comprising a cylindrical ring adapted to have the top of a garbage bag folded onto it with the main portion of the bag depending therefrom, a first mounting means for removably attaching the garbage bag holder to a wall of a kitchen sink mounted on the outside of the ring with a first suction cup facing outwardly from the ring, and a second mounting means for removably attaching the garbage holder to a wall of a sink mounted on the outside of the ring with a second suction cup facing outwardly from the ring, the first suction cup facing 90° away from the second suction cup so as to attach to adjacent walls in a corner of a sink, said first mounting means including a first mounting bracket, said second mounting means including a second mounting bracket, said brackets being mounted 180° apart from each other on the outside of the ring, each bracket having a right angle with surfaces tangent to the circumference of the ring with a first tangent surface of the first bracket being parallel to a first tangent surface of the second bracket and a second tangent surface of the first bracket being parallel to a second tangent surface of the second bracket, whereby the removable bag holder is adapted to be mounted in a corner of a kitchen sink with the top portion of the ring positioned above the bottom wall of the sink and is adapted to hold a garbage bag at its top with the bottom of the bag resting on the bottom wall of the sink, as desired.

* * * * *